United States Patent
Kashima et al.

(10) Patent No.: US 9,998,049 B2
(45) Date of Patent: Jun. 12, 2018

(54) INVERTER CONTROL DEVICE AND AIR CONDITIONER

(71) Applicant: Mitsubishi Electric Corporation, Tokyo (JP)

(72) Inventors: Mitsuo Kashima, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/565,227

(22) PCT Filed: Aug. 4, 2015

(86) PCT No.: PCT/JP2015/072119
§ 371 (c)(1),
(2) Date: Oct. 9, 2017

(87) PCT Pub. No.: WO2017/022084
PCT Pub. Date: Feb. 9, 2017

(65) Prior Publication Data
US 2018/0091079 A1    Mar. 29, 2018

(51) Int. Cl.
*G05B 11/28* (2006.01)
*H02P 21/22* (2016.01)
(Continued)

(52) U.S. Cl.
CPC ............ *H02P 21/22* (2016.02); *F25B 49/025* (2013.01); *H02M 7/5395* (2013.01); *H02P 5/74* (2013.01);
(Continued)

(58) Field of Classification Search
CPC ...... H02P 1/00; H02P 3/00; H02P 6/00; H02P 21/00; H02P 27/04; H02P 27/06; H02P 41/00; G05B 11/28
(Continued)

(56) References Cited

U.S. PATENT DOCUMENTS 7,504,784 B2 *  3/2009  Asada ................... D06F 37/304
                                                              318/400.02

FOREIGN PATENT DOCUMENTS

JP    2006-000731 A    1/2006
JP    2008-206246 A    9/2008
(Continued)

OTHER PUBLICATIONS

International Search Report of the International Searching Authority dated Oct. 20, 2015 for the corresponding international application No. PCT/JP2015/072119 (and English translation).
(Continued)

*Primary Examiner* — Antony M Paul
(74) *Attorney, Agent, or Firm* — Posz Law Group, PLC

(57) ABSTRACT

An inverter control device includes an inverter main circuit, a current detector, a voltage detector that detects a DC voltage between DC bus lines, and an inverter control unit that generates PWM signals to perform on/off control of a plurality of semiconductor switching elements respectively with a DC current and a DC voltage. The unit sets a carrier period of PWM signals to be 1/N times a calculation period in which the PWM signals are generated, performs detection of a DC current detected by the current detector in a 1/2 calculation period immediately before a calculation start timing for generating PWM signals, calculates an output voltage vector based on the detected DC current, and reflects PWM signals generated from the output voltage vector in one calculation period from a 1/2 calculation period after the calculation start timing to 3/2 control calculation periods after the same.

7 Claims, 10 Drawing Sheets

(51) Int. Cl.
*H02M 7/5395* (2006.01)
*H02P 25/022* (2016.01)
*F25B 49/02* (2006.01)
*H02P 5/74* (2006.01)

(52) U.S. Cl.
CPC ...... *H02P 25/022* (2013.01); *F25B 2600/021* (2013.01)

(58) Field of Classification Search
USPC .... 318/400.01, 400.02, 400.14, 400.15, 700, 318/701, 727, 779, 799, 800, 801, 599, 318/811, 606, 607; 363/21.1, 40, 44, 95, 363/120, 174, 175; 361/679.48, 695, 696
See application file for complete search history.

(56) References Cited

FOREIGN PATENT DOCUMENTS

| | | |
|---|---|---|
| JP | 2011-234428 A | 11/2011 |
| JP | 2012-186957 A | 9/2012 |
| JP | 5200395 B2 | 2/2013 |
| JP | 5321530 B2 | 7/2013 |
| WO | 2010/103565 A1 | 9/2010 |

OTHER PUBLICATIONS

Extended EP Search Report dated Dec. 8, 2017 issued in corresponding EP patent application No. 15894509.7.

"Sampling of Discontinuous Voltage and Current Signals in Electrical Drives: A System Approach" published Oct. 1, 1998 by Valdimir Blasko et al., IEEE Transactions on Industry Applications, vol. 34, No. 5, Sep./Oct. 1998, XP011022435, ISSN: 0093-9994 (cited in the Extended EP Search Report attached).

"Use of PWM and ADC on MC56F84789 to Drive Dual PMS Motor FOC" published Oct. 1, 2012 by Jaroslav Musil, pp. 1-26, XP055428379 (cited in the Extended EP Search Report attached).

\* cited by examiner

| BASIC VOLTAGE VECTOR | SWITCHING ELEMENT STATE | | | | | | PHASE CURRENT INFORMATION ACQUIRED FROM DC CURRENT INFORMATION Idc |
|---|---|---|---|---|---|---|---|
| | SW1 | SW4 | SW2 | SW5 | SW3 | SW6 | |
| V0 | OFF | ON | OFF | ON | OFF | ON | VARIABLE |
| V1 | ON | OFF | OFF | ON | OFF | ON | +Iu |
| V2 | ON | OFF | ON | OFF | OFF | ON | -Iw |
| V3 | OFF | ON | ON | OFF | OFF | ON | +Iv |
| V4 | OFF | ON | ON | OFF | ON | OFF | -Iu |
| V5 | OFF | ON | OFF | ON | ON | OFF | +Iw |
| V6 | ON | OFF | OFF | ON | ON | OFF | -Iv |
| V7 | ON | OFF | ON | OFF | ON | OFF | VARIABLE |

INVERTER CONTROL DEVICE AND AIR CONDITIONER

CROSS REFERENCE TO RELATED APPLICATION

This application is a U.S. national stage application of International Patent Application No. PCT/JP2015/072119 filed on Aug. 4, 2015, the disclosure of which is incorporated herein by reference.

TECHNICAL FIELD

The present invention relates to an inverter control device and an air conditioner, which convert DC power supplied from a DC bus line into three-phase AC power by driving a plurality of switching elements in an inverter main circuit.

BACKGROUND

A conventional inverter control device described in Patent Literature 1 includes an inverter main circuit including a group of upper arm switching elements connected to a positive side of a DC power supply and a group of lower arm switching elements connected to a negative side of the DC power supply, a current sensor that detects a current flowing between the DC power supply and the inverter main circuit, and a control circuit that generates a pulse width modulation (PWM) signal for performing on/off control of each of the upper arm switching elements and the lower arm switching elements. The control circuit is configured to perform control of detecting a phase current with the current sensor at the timing situated near an end of an ON period for the upper arm switching elements in and after the elapse of a half period within a carrier period, then using the current detected with the current sensor in a next carrier period, and calculating PWM modulation for a carrier period after the next.

PATENT LITERATURE

Patent Literature 1: Japanese Patent No. 5200395

However, since the conventional inverter control device performs control of using the detected current in a next carrier period and calculating PWM modulation for a carrier period after the next, responsiveness of the control is low in a use in which calculation time of the control can be a period shorter than 1/2 of the carrier period. Thus, there is a problem that it is not possible to follow a load variation at the time of high-speed rotation thereby resulting in step-out or overcurrent breaking.

SUMMARY

The present invention has been made in view of the forgoing and its object is to realize an inverter control device with improved responsiveness of control in a use in which calculation time can be a period shorter than 1/2 of a carrier period.

In order to solve the above-mentioned problems and achieve the object, the present invention provides an inverter control device comprising: at least one inverter main circuit to convert, using a plurality of semiconductor switching elements arranged between DC bus lines connected to a positive end and a negative end of a DC power supply respectively, DC power supplied by the DC power supply into three-phase AC power and output the AC power to at least one three-phase synchronous motor; at least one current detector to detect a DC current flowing in the DC bus lines; a voltage detector to detect a DC voltage between the DC bus lines; and an inverter control unit to generate a pulse width modulation signal to perform on/off control of each of the plurality of semiconductor switching elements with the DC current and the DC voltage, wherein the inverter control unit sets a calculation period in which the pulse width modulation signal is generated to be twice longer than a calculation time thereof, sets N as an integral number equal to or larger than 1, sets a carrier period of the pulse width modulation signal to be 1/N times as long as the calculation period, performs detection of the DC current detected by the current detector in a 1/2 calculation period immediately before a calculation start timing for generating the pulse width modulation signal, calculates an output voltage vector based on the detected DC current, and reflects a pulse width modulation signal generated based on the output voltage vector in one calculation period from a 1/2 calculation period after the calculation start timing to 3/2 calculation periods after the same.

An inverter control device according to the present invention produces the effect that responsiveness of control is improved in a use in which calculation time can be a period shorter than 1/2 of a carrier period.

DETAILED DESCRIPTION

In the following, an inverter control device and an air conditioner according to embodiments of the present invention will be described in detail with reference to the drawings. Note that the present invention is not limited to the embodiments.

First Embodiment

Figure 1:
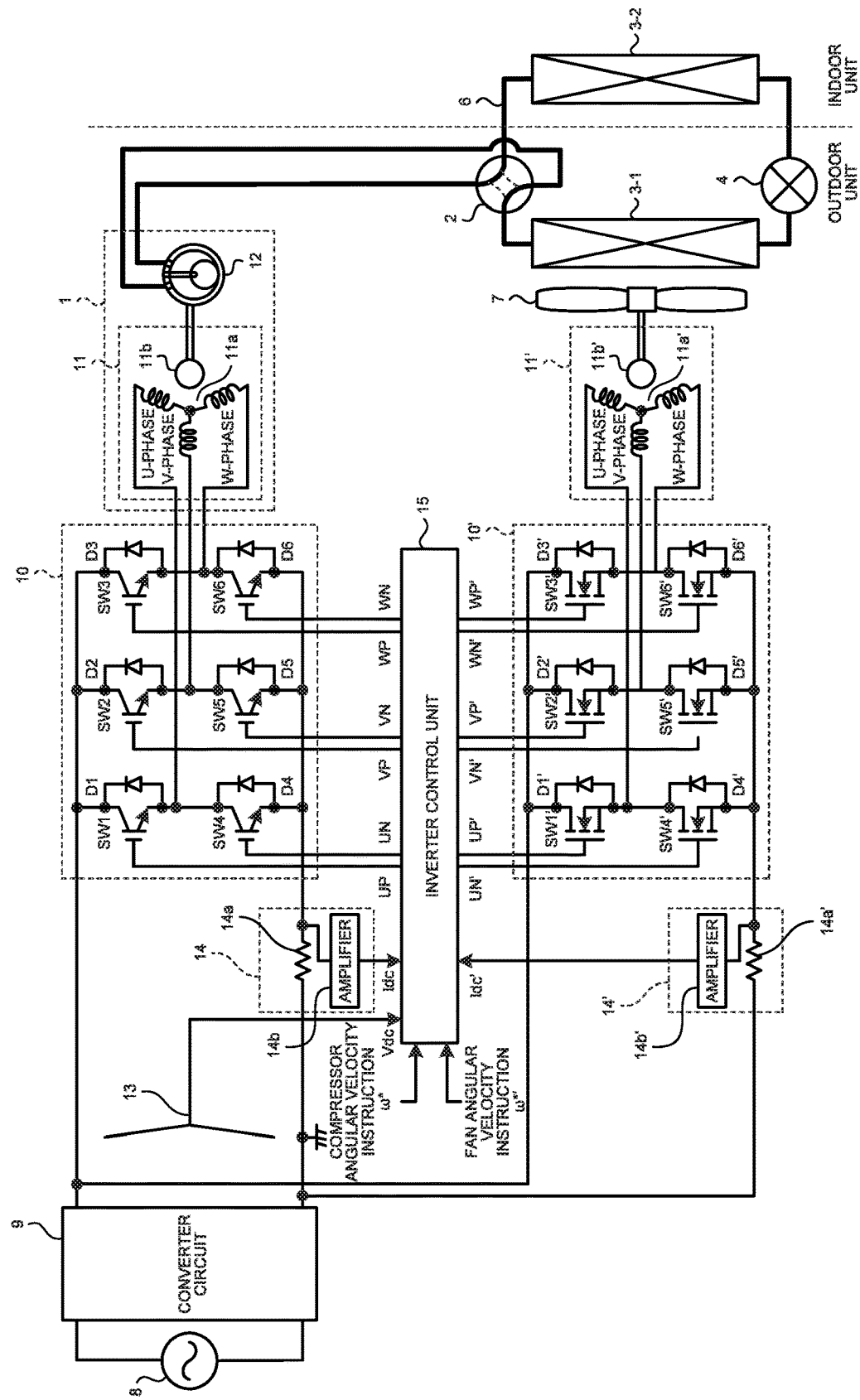
FIG. 1 is a configuration diagram of an air conditioner, in which an inverter control device according to a first embodiment of the present invention as a center.

FIG. 1 is a configuration diagram of an air conditioner, in which an inverter control device according to a first embodiment of the present invention is a main part. In FIG. 1, a separate-type air conditioner in which an indoor unit and an outdoor unit are separated is illustrated. In the present embodiment, an inverter control device for an outdoor unit in a separate-type air conditioner will be described as an example.

An air conditioner is configured to include a converter circuit 9, a first inverter main circuit 10 connected to an output end of the converter circuit 9 via a DC bus line, a second inverter main circuit 10' connected to the output end of the converter circuit 9 via a DC bus line, a compressor 1 driven by AC power supplied from the first inverter main circuit 10, a second three-phase synchronous motor 11' that drives a blast fan 7 by AC power supplied from the second inverter main circuit 10', a four-way valve 2, an outdoor heat exchanger 3-1, an indoor heat exchanger 3-2, and an expansion valve 4.

Also, the air conditioner is configured to include a voltage detector 13 that detects an output voltage of the converter circuit 9, that is, a DC voltage between positive and negative of the DC bus lines, a current detector 14 that detects a current of DC power supplied from the converter circuit 9 to the first inverter main circuit 10, that is, a DC current flowing in a DC bus line between the converter circuit 9 and the first inverter main circuit 10, a current detector 14' that detects a current of DC power supplied from the converter circuit 9 to the second inverter main circuit 10', that is, a DC current flowing in a DC bus line between the converter circuit 9 and the second inverter main circuit 10', and an inverter control unit 15.

In the air conditioner illustrated in FIG. 1, the compressor 1, the four-way valve 2, the outdoor heat exchanger 3-1, the indoor heat exchanger 3-2 and the expansion valve 4 are installed via refrigerant pipework 6, which constitutes a refrigerant circuit to circulate a refrigerant. Then, under favor of absorption or radiation of heat is caused with respect to the air to be an object of a heat exchange when the refrigerant is evaporated or condensed, the air conditioner performs an air conditioning operation while changing a pressure of a refrigerant passing through the pipe. Wind generated by a rotation of the blast fan 7 passes through the outdoor heat exchanger 3-1. Accordingly, a heat exchange between the refrigerant and the air is performed in the outdoor heat exchanger 3-1.

Similarly, wind generated by a blast fan (not illustrated) passes through the indoor heat exchanger 3-2. Accordingly, heat exchange between the refrigerant and the air is performed in the indoor heat exchanger 3-2. Here, in the air conditioner, except for the refrigerant pipework 6, only the indoor heat exchanger 3-2 is disposed on an indoor unit side of the air conditioner, and parts other than the indoor heat exchanger 3-2 are disposed on an outdoor unit side.

The converter circuit 9 converts AC power supplied from an AC power supply 8 into DC power and outputs the DC power. The converter circuit 9 is configured to include a diode bridge (not illustrated) that rectifies an output of the AC power supply 8 and a smoothing capacitor (not illustrated) that smoothes an output of the diode bridge. A configuration of the converter circuit 9 is not limited to this example and an arbitrary circuit configuration can be employed for the converter circuit 9.

The current detector 14 detects a current of DC power supplied from the converter circuit 9 to the first inverter main circuit 10, that is, a DC current flowing in a DC bus line between the converter circuit 9 and the first inverter main circuit 10, and is constructed of a shunt resistor 14a and an amplifier 14b. Also, the current detector 14' detects a current of DC power supplied from the converter circuit 9 to the second inverter main circuit 10', that is, a DC current flowing in a DC bus line between the converter circuit 9 and the second inverter main circuit 10', and is constructed of a shunt resistor 14a' and an amplifier 14b'. In the present embodiment, the current detector 14 and the current detector 14' each have a configuration using a shunt resistor. However, a configuration of the current detector 14 and the current detector 14' is not limited to this example, and may be configured to use a current sensor with high responsiveness using a Hall sensor, for example.

The first inverter main circuit 10 is configured to include a plurality of switching elements SW1, SW2, SW3, SW4, SW5 and SW6, a plurality of diodes D1, D2, D3, D4, D5 and D6 that are respectively connected to the plurality of switching elements SW1 to SW6 in inverse-parallel connection, and a drive circuit (not illustrated) to drive each of the plurality of switching elements SW1 to SW6. The three switching elements SW1, SW2 and SW3 arranged on a positive side of the DC bus lines constitute an upper arm side switching element group and the three switching elements SW4, SW5 and SW6 arranged on a negative side of the DC bus lines constitutes a lower arm side switching element group.

The second inverter main circuit 10' is configured to include a plurality of switching elements SW1', SW2', SW3', SW4', SW5' and SW6', a plurality of diodes D1', D2', D3', D4', D5' and D6' that are respectively connected to the plurality of switching elements SW1' to SW6' in inverse-parallel connection, and a drive circuit (not illustrated) to drive each of the plurality of switching elements SW1' to SW6'. The three switching elements SW1', SW2' and SW3' arranged on a positive side of the DC bus line constitute an upper arm side switching element group, and the three switching elements SW4', SW5' and SW6' arranged on a negative side of the DC bus line constitute a lower arm side switching element group.

In the present embodiment, each of the first inverter main circuit 10 and the second inverter main circuit 10' is constructed based on an IPM (Intelligent Power Module). Also, in the present embodiment, the switching elements SW1 to SW6 of the first inverter main circuit 10 are constructed based on IGBTs (Insulated Gate Bipolar Transistors), and the switching elements SW1' to SW6' of the second inverter main circuit 10' are constructed based on MOSFETs (Metal Oxide Semiconductor Field Effect Transistors). However, the first inverter main circuit 10 and the second inverter main circuit 10' are not limited to this configuration, and may be configured to use semiconductor switches such as IGCTs (Insulated Gate Controlled Thyristors) or FETs (Field Effect Transistors). Note that the first inverter main circuit 10 and the second inverter main circuit 10' are realized in the same configuration manner. Thus, a configuration of the first inverter main circuit 10 will be mainly described in the following.

The compressor 1 is configured to include a compression unit 12 to compress a refrigerant, and a first three-phase synchronous motor 11 that is connected to the first inverter main circuit 10 and that drives the compression unit 12 with three-phase AC power supplied from the first inverter main circuit 10. The first three-phase synchronous motor 11 is configured to include a three-phase Y-connection cylindrical stator 11a consisting of a U-phase, a V-phase and a W-phase, and a permanent magnet rotor 11b disposed on an inner side of the stator 11a.

The blast fan 7 is driven by the second three-phase synchronous motor 11'. The second three-phase synchronous motor 11' is driven by three-phase AC power supplied from the second inverter main circuit 10'. The second three-phase synchronous motor 11' is configured to include a three-phase Y-connection cylindrical stator 11a' consisting of a U-phase, a V-phase and a W-phase, and a permanent magnet rotor 11b' disposed on an inner side of the stator 11a'.

Based on DC voltage information Vdc detected by the voltage detector 13, DC current information Idc detected by the current detector 14, and a compressor angular velocity instruction ω* inputted from the outside, the inverter control unit 15 generates PWM signals to drive the six switching elements SW1 to SW6 included in the first inverter main circuit 10. Also, based on the DC voltage information Vdc, DC current information Idc' detected by the current detector 14', and a fan angular velocity instruction ω*' inputted from the outside, the inverter control unit 15 generates PWM signals to drive the six switching elements SW1' to SW6' included in the second inverter main circuit 10'.

In FIG. 1, the PWM signals to drive the plurality of switching elements SW1 to SW6 are referred to as UP, UN, VP, VN, WP and WN. UP, VP and WP are PWM signals for the switching element group on the upper arm side, which is arranged on the positive side of the DC bus line of the first inverter main circuit 10, and become drive signals for the plurality of switching elements SW1, SW2 and SW3, respectively. UN, VN and WN are PWM signals for the switching element group on the lower arm side, which is arranged on the negative side of the DC bus line of the first inverter main circuit 10, and become drive signals for the plurality of switching elements SW4, SW5 and SW6, respectively. Also, in FIG. 1, the PWM signals to drive the plurality of switching elements SW1' to SW6' are referred to as UP', UN', VP', VN', WP' and WN'. UP', VP' and WP' are PWM signals for the switching element group on the upper arm side, which is arranged on the positive side of the DC bus line of the second inverter main circuit 10', and become drive signals for the plurality of switching elements SW1', SW2' and SW3', respectively. UN', VN' and WN' are PWM signals for the switching element group on the lower arm side, which is arranged on the negative side of the DC bus line of the second inverter main circuit 10', and become drive signals for the plurality of switching elements SW4', SW5' and SW6', respectively.

Figure 2:
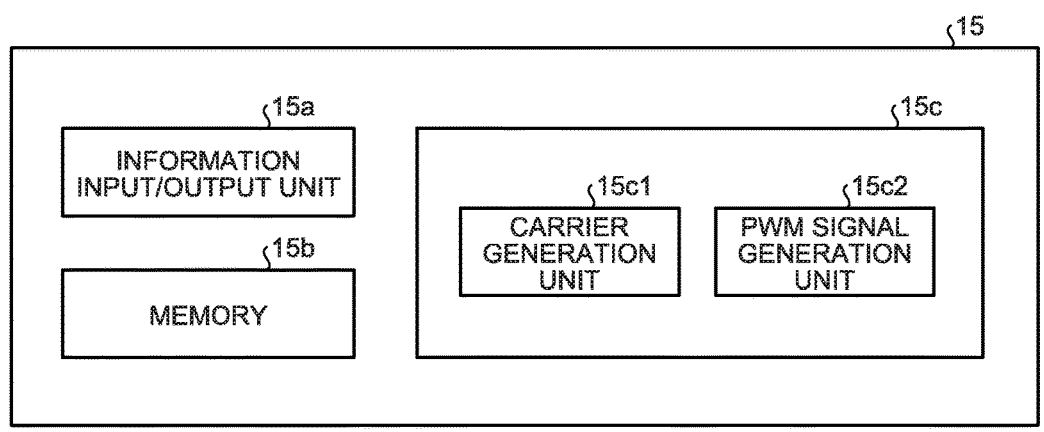
FIG. 2 is a diagram illustrating a hardware configuration of an inverter control unit according to the first embodiment of the present invention is a main part.

FIG. 2 is a diagram illustrating a hardware configuration of the inverter control unit according to the first embodiment of the present invention. The inverter control unit 15 includes an information input/output unit 15a, a memory 15b, and a calculation unit 15c. The calculation unit 15c includes a carrier generation unit 15c1 and a PWM signal generation unit 15c2. The calculation unit 15c is a processor such as a CPU (Central Processing Unit) or an MPU (Micro Processing Unit). The memory 15b is a storage medium such as a RAM (Random Access Memory) or a ROM (Read Only Memory) and the information input/output unit 15a is an interface circuit to input the DC voltage information Vdc and the DC current information Idc and to output the PWM signals. When a program for the calculation unit 15c is stored in the memory 15b and this program is executed by the calculation unit 15c that is a processor, the carrier generation unit 15c1 and the PWM signal generation unit 15c2 are realized.

Next, an operation in the inverter control unit 15 will be described.

Figure 3:
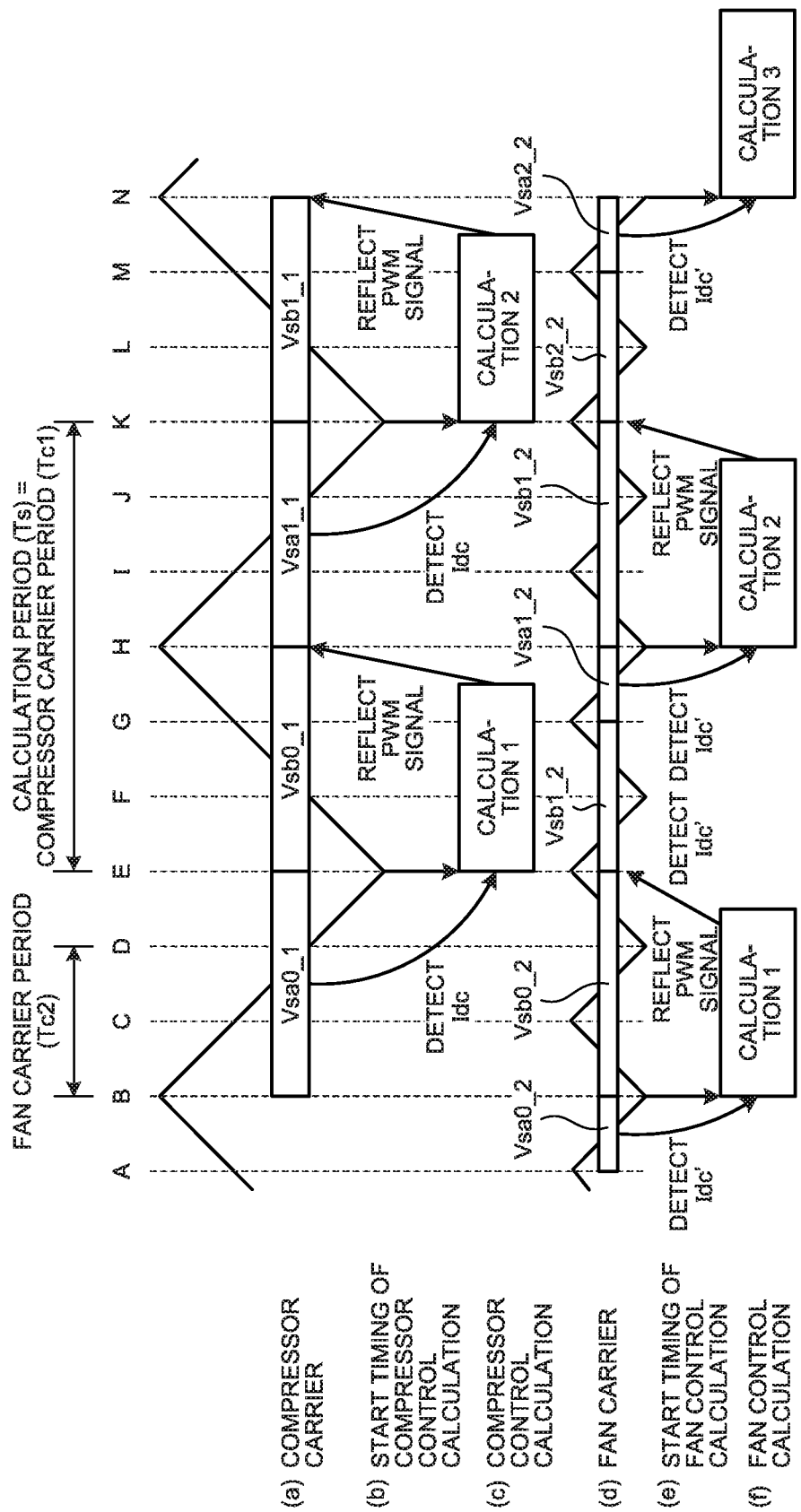
FIG. 3 is a timing chart of a first inverter control calculation and a second inverter control calculation in the inverter control unit according to the first embodiment of the present invention.

FIG. 3 is a timing chart of a first inverter control calculation and a second inverter control calculation in the inverter control unit according to the first embodiment of the present invention. The first inverter control calculation is a calculation to generate PWM signals to drive the plurality of switching elements of the first inverter main circuit 10, and the second inverter control calculation is a calculation to generate PWM signals to drive the plurality of switching elements of the second inverter main circuit 10'. In the following, there may be a case where the first inverter control calculation is referred to as a compressor control calculation and the second inverter control calculation is referred to as a fan control calculation.

In FIG. 3, (a) indicates a compressor carrier of the PWM signals generated by the compressor control calculation. (b) indicates start timing of the compressor control calculation. (c) indicates a processing section of the compressor control calculation. (d) indicates a fan carrier of the PWM signals generated by the fan control calculation. (e) indicates start timing of the fan control calculation. (f) indicates a processing section of the fan control calculation.

Each of Vsa and Vsb written on the compressor carrier in (a) indicates a section in which a first output voltage vector calculated by the compressor control calculation in (c) is reflected. Each of Vsa and Vsb written on the fan carrier in (d) indicates a section in which a second output voltage vector calculated by the fan control calculation in (f) is reflected. Details of the output voltage vector will be described later. Here, the output voltage vector is represented as "Vsxy_z" for convenience. A part "x" in the output voltage vector Vsxy_z may have "a" and "b". An output voltage vector with "x=a" means a vector that can reproduce phase current information for two phases about a current flowing in a synchronous motor, from DC current information detected by the current detector 14 or 14'. An output voltage vector with "x=b" means an output voltage vector such that the output voltage vector per calculation period (described later) is obtained when two vectors are combined. However, although it will be described later, in a case where a modulation factor is equal to or larger than 1, there may be a state in which the combination of the two vectors does not correspond to an output voltage vector per calculation period. A part "y" of Vsxy_z is assigned with an integral number. For example, an output voltage vector with "y=1" is an output voltage vector calculated by a "Calculation 1" in FIG. 3 (c) or FIG. 3 (f) and an output voltage vector with "y=2" is an output voltage vector calculated by a "Calculation 2" in FIG. 3 (c) or FIG. 3 (f). A part "z" of Vsxy_z is assigned with "1" or "2." An output voltage vector with "z=1" is an output voltage vector obtained by the compressor control calculation that is the first inverter control calculation, and an output voltage vector with "z=2" is an output voltage vector obtained by the fan control calculation that is the second inverter control calculation. Also, in the inverter control unit 15, a bilaterally-symmetrical triangular wave carrier is used for a compressor carrier and a fan carrier. Also, the inverter control unit 15 sets the same calculation period Ts, for example, Ts=1/5 kHz for the compressor control calculation and the fan control calculation, and their respective carrier frequencies as 5 kHz and 15 kHz, for example, that are values able to be realize synchronization. Then, the inverter control unit 15 performs the compressor control calculation for each one carrier period of Tc1 that is a compressor carrier period, performs the fan control calculation for each three carrier periods of Tc2 that is a fan carrier period, and thereby performs setting their respective calculation start timings to be shifted by a 1/2 calculation period. Note that it is assumed that a calculation processing time of each calculation is shorter than a 1/2 calculation period.

First, an operation of the compressor control that is the first inverter control of the inverter control unit 15 will be described at a timing of the "Calculation 1" in FIG. 3(c). A calculation start timing of the "Calculation 1" is a valley timing E of the compressor carrier. The inverter control unit 15 detects DC current information Idc to be used in the "Calculation 1" in a section from B to E that is a half carrier period of the compressor carrier immediately before the calculation start timing E. In this half carrier period section from B to E, PWM signals corresponding to an output voltage vector "Vsa0_1" are outputted. Therefore, the inverter control unit 15 can detect phase current information that is information of phase currents for two phases, which flow in the first three-phase synchronous motor 11, from the DC current information Idc. The inverter control unit 15 obtains an output voltage vector at a timing K that is a timing one calculation period after the calculation start timing E based on the DC current information Idc, and performs a calculation for generating PWM signals corresponding to this output voltage vector in a section from E to H in 1/2 calculation period from the calculation start timing E. The generated PWM signals are reflected in a section from H to N, that is, from the 1/2 calculation period after the calculation start timing E to 3/2 calculation period thereafter. Here, the inverter control unit 15 outputs PWM signals corresponding to an output voltage vector "Vsa1_1" in a section from H to K in a half carrier period of the compressor carrier, immediately before the calculation start timing K of the next "Calculation 2", and outputs PWM signals corresponding to an output voltage vector "Vsb1_1" in a remaining section from K to N. Similarly, the inverter control unit 15 also performs calculations following the "Calculation 2" in FIG. 3(c) for each calculation period Ts. Here, a calculation start timing is not necessarily set to a valley timing of a triangular wave carrier, and may be a timing later than the above-described valley timing as long as the calculation can be completed before a timing at which the PWM signals are to be reflected.

Then, an operation of the fan control that is the second inverter control of the inverter control unit 15 will be described at a timing of a "Calculation 1" in FIG. 3 (f). A calculation start timing of the "Calculation 1" is a valley timing B of the fan carrier. The inverter control unit 15 detects DC current information Idc' to be used in the "Calculation 1" in a section from A to B in a half carrier period of a fan carrier immediately before the calculation start timing B. In this half carrier period section from A to B, since PWM signals corresponding to an output voltage vector "Vsa0_2" is outputted, the inverter control unit 15 can detect phase current information for two phases about a current flowing in the second three-phase synchronous motor 11', from the DC current information Idc'. The inverter control unit 15 obtains an output voltage vector at a timing H that is a timing one calculation period after the calculation start timing B, based on the DC current information Idc', and performs a calculation for generating PWM signals corresponding to this output voltage vector within a section from B to E in 1/2 calculation period from the calculation start timing B. The generated PWM signals are reflected in a section from E to K, that is, from the 1/2 calculation period after the calculation start timing B to 3/2 calculation period thereafter. Here, the inverter control unit 15 outputs PWM signals corresponding to an output voltage vector "Vsa1_2" in a section from G to H that is a half carrier period of the fan carrier immediately before the start timing H of the next "Calculation 2", and outputs PWM signals corresponding to an output voltage vector "Vsb1_2" in remaining sections from E to G and from H to K. Similarly, the inverter control unit 15 also performs a calculation following the "Calculation 2" in FIG. 3(f) for each calculation period Ts. Here, a calculation start timing is not necessarily set to a valley timing of a triangular wave carrier, and may be a timing later than the above-described valley timing as long as the calculation can be completed before a timing at which PWM signals are to be reflected.

Here, the compressor control that is the first inverter control and the fan control that is the second inverter control are equal to each other in operation except for a respect of a carrier frequency. For this reason, in the following, the compressor control that is the first inverter control will be mainly described for an output voltage vector calculated by the inverter control unit 15.

When a value of a γ-axis voltage Vγ and a value of a δ-axis voltage Vδ in a control axis (γ-δ-axis) of a rotary coordinate system are calculated, a magnitude |Vs| of an output voltage vector Vs is calculated by the following expression (1) and a phase θv from a γ-axis is calculated from the following expression (2). The γ-axis voltage Vγ and the δ-axis voltage Vδ can be calculated from a compressor angular velocity instruction ω* and phase current information on a current flowing in the first three-phase synchronous motor 11 by a known method described in Japanese Patent No. 3860031, for example. Also, a modulation factor Vk in this case is calculated by the following expression (3) using a DC voltage between DC bus lines outputted from the converter circuit 9, that is, the DC voltage information Vdc.

[Formula 1]

$$|Vs| = \sqrt{v\gamma^2 + v\delta^2} \qquad (1)$$

[Formula 2]

$$\theta v = \tan^{-1}\frac{v\delta}{v\gamma} \qquad (2)$$

[Formula 3]

$$Vk = |Vs| \times \sqrt{2} / Vdc \qquad (3)$$

Next, a relationship between the output voltage vector Vs and the switching elements of the first inverter main circuit 10 will be described.

Figures 4, 5:
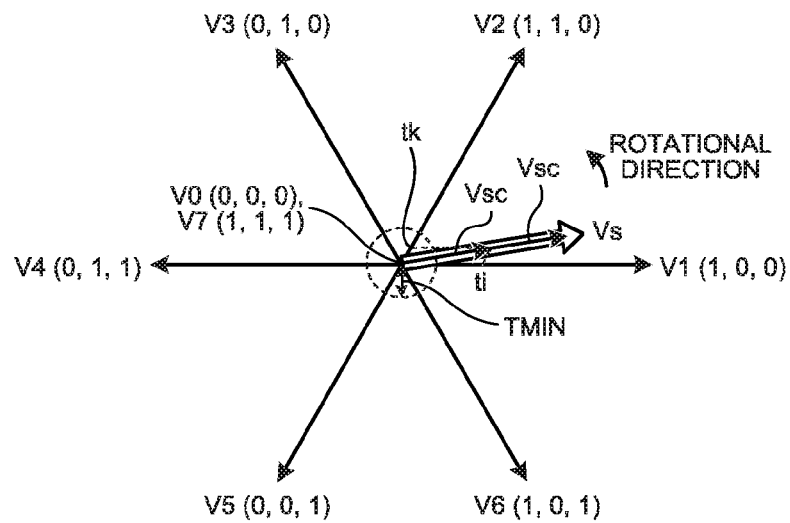
FIG. 4 is a vector diagram of an output voltage vector Vs calculated in a compressor control calculation in the inverter control unit according to the first embodiment of the present invention.
FIG. 5 is a chart illustrating a correspondence relationship between switching states of switching elements of an inverter main circuit for a basic voltage vector and phase current information obtained from DC current information.
Figure 6:
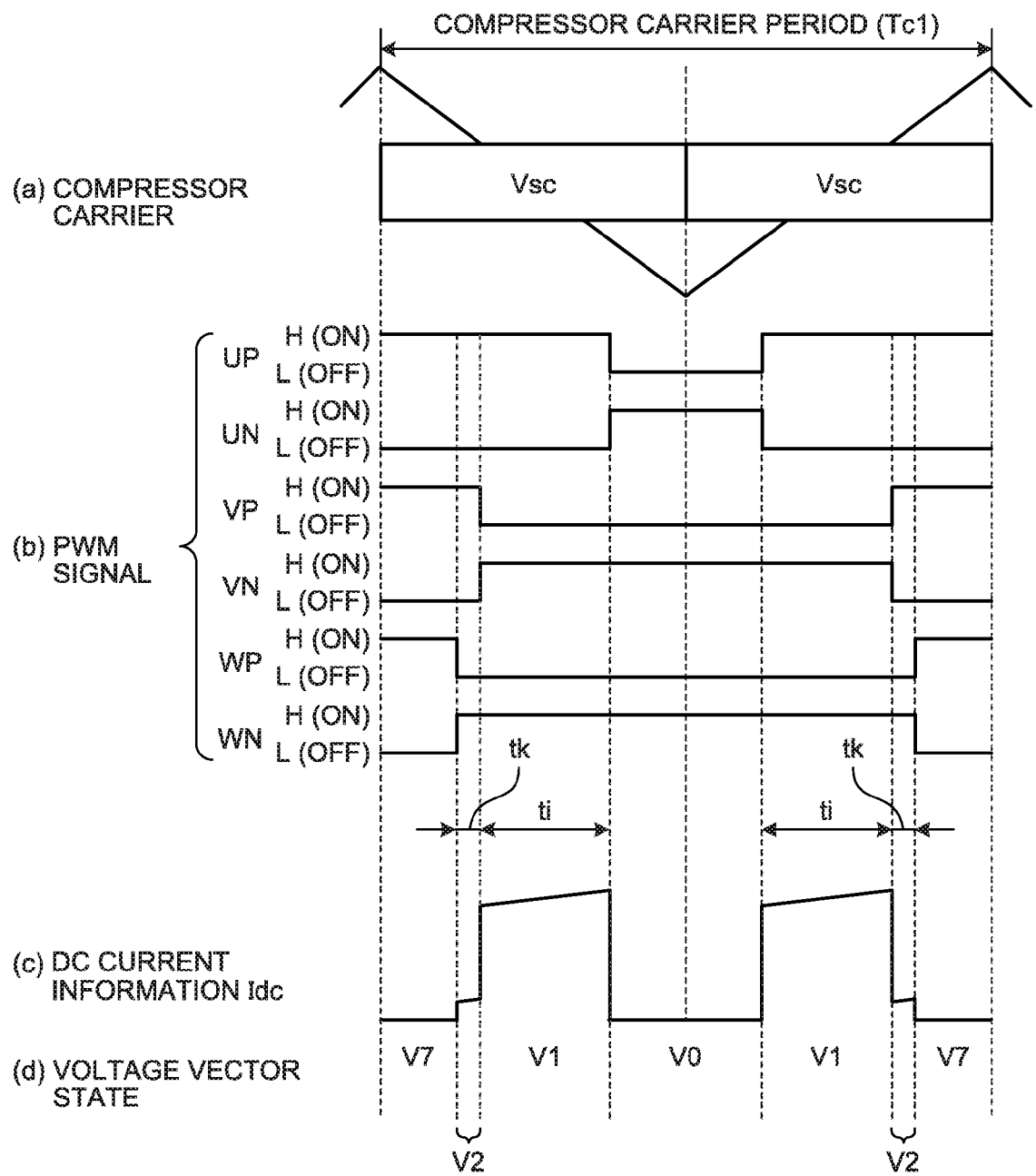
FIG. 6 is a timing chart of PWM signals corresponding to the output voltage vector Vsc illustrated in FIG. 4.
Figure 7:
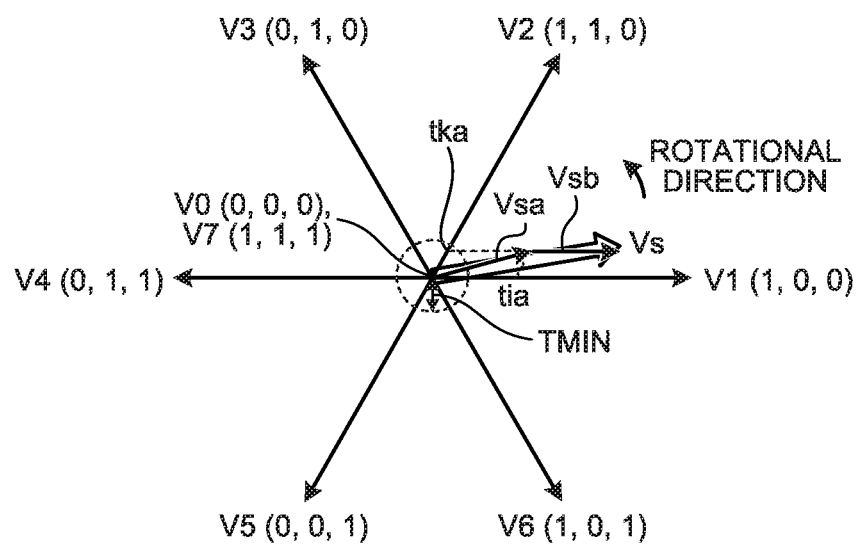
FIG. 7 is a vector diagram of two output voltage vectors Vsa and Vsb calculated in the compressor control calculation in the inverter control unit according to the first embodiment of the present invention.

FIG. 4 is a vector diagram of the output voltage vector Vs calculated in the compressor control calculation in the inverter control unit according to the first embodiment of the present invention, and FIG. 5 is a chart illustrating a correspondence relationship between switching states of the switching elements of the inverter main circuit for a basic voltage vector and phase current information acquired from DC current information. FIG. 6 is a timing chart of the PWM signals corresponding to an output voltage vector Vsc illustrated in FIG. 4. FIG. 7 is a vector diagram of two output voltage vectors Vsa and Vsb calculated in the compressor control calculation in the inverter control unit according to the first embodiment of the present invention.

V0 to V7 illustrated in FIG. 4 are basic voltage vectors and correspond to eight combinations of on/off states of the plurality of switching elements SW1 to SW6 of the first inverter main circuit 10 as illustrated in FIG. 5. As illustrated in FIG. 5, for the basic voltage vector V0, the switching elements SW1, SW2 and SW3 are OFF and the switching elements SW4, SW5 and SW6 are ON. For the basic voltage vector V1, the switching elements SW2, SW3 and SW4 are OFF and the switching elements SW1, SW5 and SW6 are ON. For the basic voltage vector V2, the switching elements SW3, SW4 and SW5 are OFF and the switching elements SW1, SW2 and SW6 are ON. For the basic voltage vector V3, the switching elements SW1, SW3 and SW5 are OFF and the switching elements SW2, SW4 and SW6 are ON. For the basic voltage vector V4, the switching elements SW1, SW5 and SW6 are OFF and the switching elements SW2, SW3 and SW4 are ON. For the basic voltage vector V5, the switching elements SW1, SW2 and SW6 are OFF and the switching elements SW3, SW4 and SW5 are ON. For the basic voltage vector V6, the switching elements SW2, SW4 and SW6 are OFF and the switching elements SW1, SW3 and SW5 are ON. For the basic voltage vector V7, the switching elements SW4, SW5 and SW6 are OFF and the switching elements SW1, SW2 and SW3 are ON.

FIG. 5 also shows a correspondence relationship between states of the voltage vectors and phase current information on a current that flows in the first three-phase synchronous motor 11 and is acquired from the DC current information Idc in a case where each of the switching elements becomes in a state of non-zero voltage vectors V1 to V6. Phase current information "+Iu" corresponds to the basic voltage vector V1, phase current information "−Iw" corresponds to the basic voltage vector V2, phase current information "+Iv" corresponds to the basic voltage vector V3, phase current information "−Iu" corresponds to the basic voltage vector V4, phase current information "+Iw" corresponds to the basic voltage vector V5, and phase current information "−Iv" corresponds to the basic voltage vector V6. "+" of the phase current information represents a direction of a phase current that flows from the first inverter main circuit 10 in a direction toward the stator 11a of the first three-phase synchronous motor 11 and "−" of the phase current information represents the opposite direction.

In the vector diagram in FIG. 4, a magnitude of the output voltage vector Vs is represented as a magnitude per calculation period Ts. In the first embodiment, a carrier period of the compressor carrier is set to be identical to a calculation period of the compressor control calculation. For this reason, an output voltage vector Vsc per half carrier period (Tc1/2) is 1/2 of the magnitude of the output voltage vector Vs. ti is an output time per half carrier period of V1 that is one basic voltage vector of V1 and V2 that are basic voltage vectors which are adjacent to the output voltage vector Vsc and whose magnitude is not zero, the one basic voltage vector being situated in an original angular direction of a rotational direction. The original angular direction of the rotational direction means a rear side with respect to a rotational direction of the output voltage vector. tk is an output time per half carrier period of V2 that is the basic voltage vector ahead in the rotational direction. Ahead in a rotational direction means a front side with respect to a rotational direction of the output voltage vector. TMIN is a minimum time necessary to detect a DC current supplied to the first inverter main circuit 10. The minimum time TMIN is set in consideration of a ringing time caused in the DC current supplied to the first inverter main circuit 10 and a delay time of the current detector 14.

Here, an angle to the output voltage vector Vs from V1 that is one basic voltage vector of V1 and V2 which are adjacent to the output voltage vector Vsc and whose magnitude is not zero, the one basic voltage vector being situated in an original angular direction of the rotational direction, is represented as θx[°] (not illustrated). Here, the times ti and tk can be calculated by the following expressions (4) and (5), respectively.

[Formula 4]

$$ti = Vk \times (Tc1/2) \times \sin(60° - \theta x) \quad (4)$$

[Formula 5]

$$tk = Vk \times (Tc1/2) \times \sin(\theta x) \quad (5)$$

In FIG. 6, (a) indicates a compressor carrier. (b) indicates PWM signals of the switching elements SW1 to SW6 of the first inverter main circuit 10. (c) indicates DC current information Idc outputted from the current detector 14. (d) indicates a voltage vector state corresponding to the PWM signals. Also, Vsc written on the compressor carrier in (a) indicates an output voltage vector outputted in a half carrier period of the compressor carrier. In FIG. 6, there are shown Vsc outputted in a falling half period of a carrier and Vsc outputted in a rising half period of the carrier. In (b), in a case where a PWM signal is "H (ON)", the corresponding switching element is in an ON operation, and in a case where the PWM signal is "L (OFF)", the corresponding switching element is in an OFF operation. For example, in a case where the PWM signal UP is "H (ON)", SW1 that is the corresponding switching element is turned ON and in a case where UP is "L (OFF)", SW1 is turned OFF. In the first embodiment, an output ratio of the zero vectors V0 and V7 in a half carrier period is 1:1. However, this output ratio can be set arbitrarily. Also, at the time of changeover "from ON to OFF" or "from OFF to ON" of switching states of the PWM signals UP and UN, VP and VN, and WP and WN, it is necessary to provide upper/lower short-circuit prevention time for preventing short-circuit between the upper and lower switching elements. However, this is omitted here to simplify a description. In such a manner, when an output voltage vector is calculated, it is possible to generate PWM signals corresponding to the output voltage vector.

As illustrated in FIG. 4, an output time ti of the output voltage vector Vsc is equal to or longer than TMIN but an output time tk of the output voltage vector Vsc is shorter than TMIN. Accordingly, in the inverter control unit 15, it is not possible to acquire phase current information for two phases from the DC current information Idc. Thus, as illustrated in FIG. 7, the inverter control unit 15 according to the present embodiment separately outputs an output voltage vector Vs par calculation period Ts, that is, outputs Vsa that is a first output voltage vector, in which phase current information for two phases is acquired from the DC current information Idc, and Vsb that is a second output voltage vector, combination of which and Vsa is Vs, individually. More specifically, an output time per half carrier period of V1 that is one basic voltage vector of V1 and V2 that are the basic voltage vectors which are adjacent to the voltage vector Vsa and whose magnitude is not zero, the one basic voltage vector being situated in an original angular direction of the rotational direction, is set as tia and "tia=ti" is set. And an output time per half carrier period of V2 that is the other basic voltage vector ahead in the rotational direction is set as tka and "tka=TMIN" is set. Here, in a case where "(tia+tka)>(Tc1/2)", one of tia and tka which has longer output time is set as "(Tc1/2)−TMIN." Also, an output time per remaining output section of the basic voltage vector situated in an original angular direction of the rotational direction of the output voltage vector Vsb (half carrier period in FIG. 7) is set as tib. Also, an output time per remaining output section of the basic voltage vector ahead in the rotational direction of the output voltage vector Vsb (half carrier period in FIG. 7) is set as tkb. Then, in a case of "(tib+tkb)>(Tc1/2)×Nc", shorter one of the output times tib and tkb is brought closer to zero so that "(tib+tkb)=(Tc1/2)×Nc" is satisfied. Nc is the number of half carrier periods in a section in which Vsb is outputted. In this case, Nc=1. Here, in a case where "(tib+tkb)=(Tc1/2)×Nc" is not satisfied even when one having a shorter output time is set to zero, another one having a longer output time is further set to "(Tc1/2)×Nc". When a modulation factor is equal to or larger than 1, the output voltage vector Vsb becomes such a state. In this case, a combinational vector of the output voltage vector Vsa and the output voltage vector Vsb is not completely identical with the output voltage vector Vs.

Figure 8:
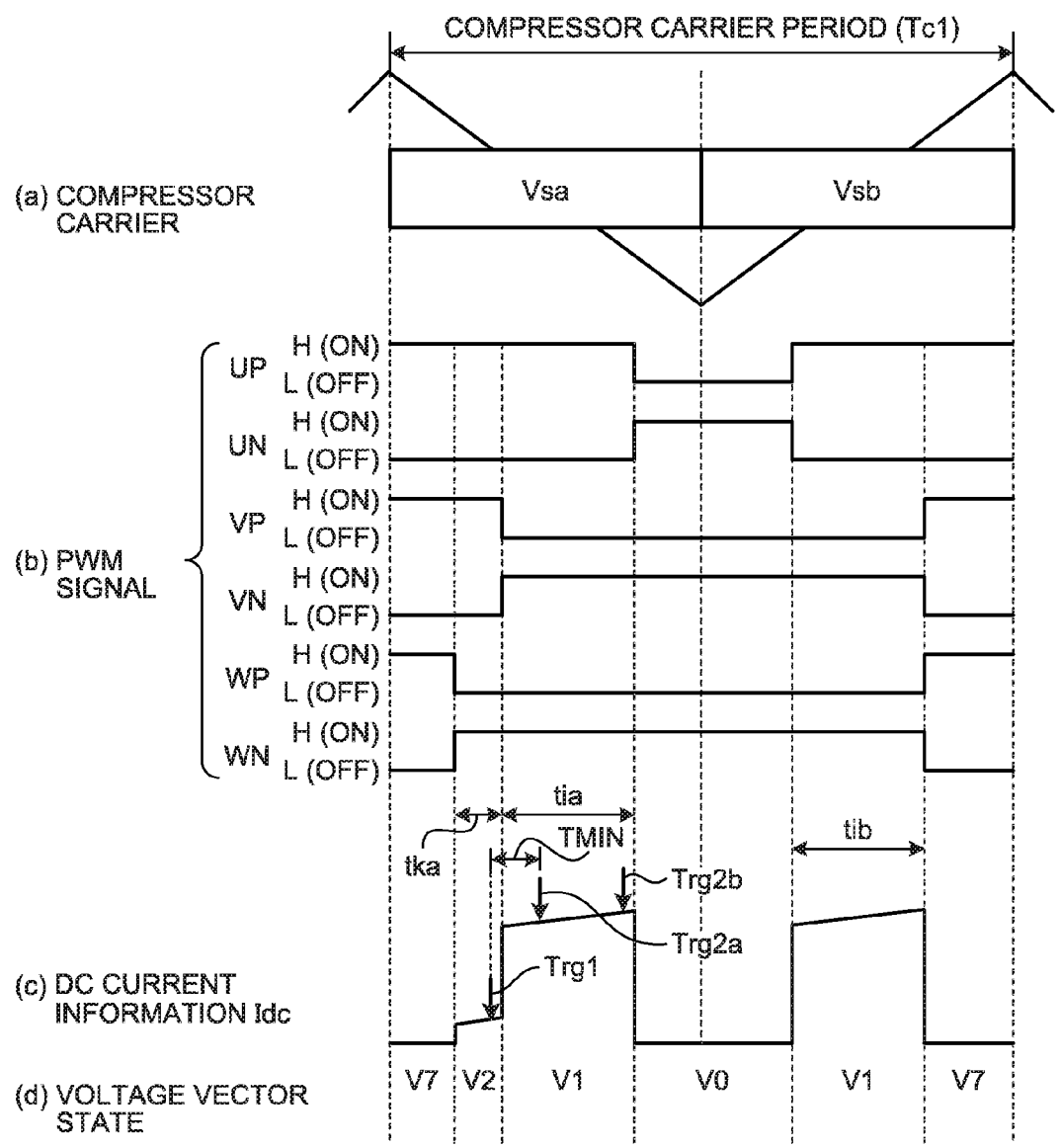
FIG. 8 is a timing chart of PWM signals corresponding to the output voltage vectors Vsa and Vsb in FIG. 7.

FIG. 8 is a timing chart of PWM signals corresponding to the output voltage vectors Vsa and Vsb in FIG. 7. FIG. 8 shows a case where the inverter control unit 15 outputs the output voltage vector Vsa in a falling half carrier period of the compressor carrier and outputs the output voltage vector Vsb in a rising half carrier period of the compressor carrier. More specifically, the inverter control unit 15 outputs the output voltage vectors Vsa and Vsb according to the above-described timings of (a) to (c) in FIG. 3. Meanings of (a) to (d) in FIG. 8 are identical to those of (a) to (d) in FIG. 6. In a compressor carrier half period in which the output voltage vector Vsa in FIG. 8 is outputted, ON widths of UP, VP and WP that are PWM signals for the switching elements on the upper arm side are different from each other. Among these three PWM signals, the ON width of UP is a maximum value, the ON width of VP is an intermediate value, and the ON width of WP is a minimum value.

Detection timings Trg1, Trg2a and Trg2b in (c) of FIG. 8 indicate detection timings for acquiring phase current information for two phases from the DC current information Idc, respectively. The detection timing Trg1 is a timing immediately before a PWM signal having an ON width with an intermediate value (such as VP in FIG. 8) among the PWM signals for the switching element group on the upper arm side is switched from ON to OFF. The detection timing Trg2a is a timing immediately after a PWM signal having an ON width with the intermediate value (such as VP in FIG. 8) among the PWM signals for the switching element group on the upper arm side is switched from ON to OFF. The detection timing Trg2b is a timing immediately before a PWM signal having an ON width with a maximum value (such as UP in FIG. 8) among the PWM signals for the switching element group on the upper arm side is switched from ON to OFF.

FIG. 8 shows a case where detection is performed in a minimum time for which phase current information for two phases can be acquired before and after VP is switched from ON to OFF when the phase current information for two phases is acquired from the DC current information Idc at the detection timings of Trg1 and Trg2a. The "minimum time" is identical to the minimum time TMIN mentioned above. FIG. 8 also shows a case where phase current information in each voltage vector state is detected immediately before VP and UP are respectively switched from ON to OFF when phase current information for two phases is acquired from the DC current information Idc at the detection timings of Trg1 and Trg2b.

In a case of acquiring phase current information for two phases from the DC current information Idc at the detection timings of Trg1 and Trg2a, since it is possible to acquire the phase current information for two phases from the DC current information Idc at an interval of the minimum time, there is an advantage that a phase current for remaining one phase can be also reproduced accurately based on a relationship of "Iu+Iv+Iw=0". However, Trg1 is a timing close to an end of a voltage vector state to be detected and Trg2a is a timing immediately after switching to the voltage vector state to be detected is performed, and therefore, states of the detected phase currents are different from each other.

On the other hand, in a case of acquiring phase current information for two phases from the DC current information Idc at the detection timings of Trg1 and Trg2b, since detection is performed near each of ends of voltage vector states to be detected, there is an advantage that a phase current value near a peak toward which the voltage vector state is outputted can be detected as each piece of the acquired phase current information. However, an interval between Trg1 and Trg2b lengthens around a half carrier period at maximum. Therefore, since an influence of the interval between Trg1 and Trg2b is small in a case where the number of rotations is small, it is better to acquire the phase current information for two phases from the DC current information at the detection timings of Trg1 and Trg2b. Also, in a case where the number of rotations is large, it is better to acquire the phase current information for two phases from the DC current information at the detection timings of Trg1 and Trg2a.

Next, an output voltage vector in a carrier frequency of the fan will be described with reference to FIGS. 9 and 10. Here, in order to simplify a description, the signs used in the description of FIGS. 4 and 7 will be also used with the same meaning for fan control. However, in a case of the fan control, a carrier period in the above expressions (4) and (5) is assigned with "Tc2" instead of "Tc1". Also, the minimum time TMIN has a different value when configurations of switching elements and a current detector used in the first inverter main circuit 10 are changed. However, in FIGS. 9 and 10, the minimum time TMIN is illustrated with its size being identical with that of the minimum time TMIN in FIGS. 4 and 7.

Figure 9:
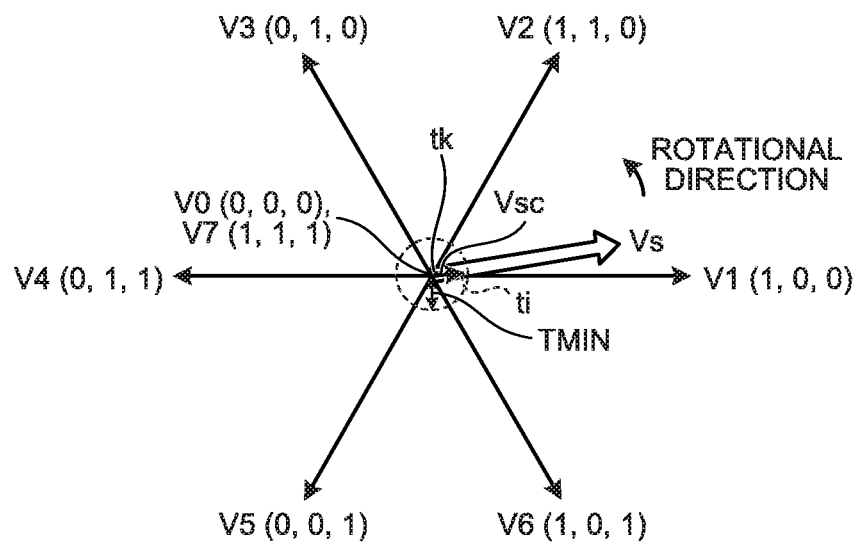
FIG. 9 is a vector diagram of an output voltage vector Vs calculated in a fan control calculation in the inverter control unit according to the first embodiment of the present invention.

FIG. 9 is a vector diagram of an output voltage vector Vs calculated in a fan control calculation in the inverter control unit according to the first embodiment of the present invention. FIG. 10 is a vector diagram of two output voltage vectors Vsa and Vsb calculated in the fan control calculation in the inverter control unit according to the first embodiment of the present invention. In FIGS. 9 and 10, description is made for a case where an output voltage vector Vs per calculation period is in the same state as in FIGS. 4 and 7. In the present embodiment, since a carrier period of a fan carrier is 1/3 of a calculation period of the fan control calculation, a magnitude of an output voltage vector Vsc per half carrier period (Tc2/2) is 1/6 of a magnitude of a vector Vs, as illustrated in FIG. 9. In this case, the output times ti and tk of the output voltage vector Vsc are each equal to or shorter than TMIN, and it is not possible to acquire phase current information of the second three-phase synchronous motor 11' from the DC current information Idc'. Therefore, as illustrated in FIG. 10, the inverter control unit 15 according to the present embodiment separately outputs an output voltage vector Vs per calculation period Ts, that is, outputs Vsa that is a first output voltage vector in which phase current information for two phases is acquired from the DC current information Idc, and Vsb that is a second output voltage vector combination of which and the output voltage vector Vsa is Vs, individually. Here, the inverter control unit 15 outputs the output voltage vector Vsa in a half carrier period of the fan carrier. Also, in 2.5 carrier periods that are a remaining output section, the inverter control unit 15 equally divides and outputs the output voltage vector Vsb for each half carrier period. That is, the inverter control unit 15 outputs the output voltage vectors Vsa and the output voltage vector Vsb according to the above-described timings of (d) to (f) in FIG. 3.

Figure 10:
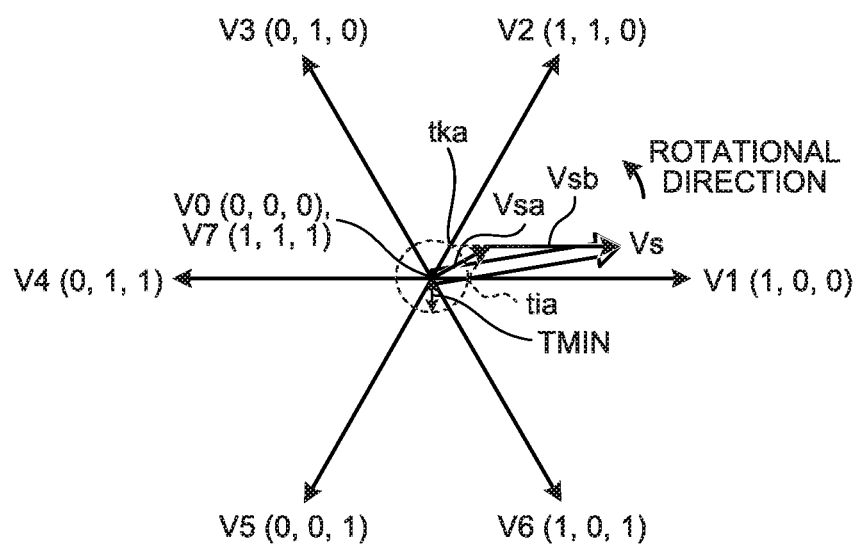
FIG. 10 is a vector diagram of two output voltage vectors Vsa and Vsb calculated in the fan control calculation in the inverter control unit according to the first embodiment of the present invention.

Here, in FIG. 10, each of the output times tia and tka of the output voltage vector Vsa is TMIN. However, in a case where the output time ti of Vsc>the minimum time TMIN, "tia=ti" is set and in a case where tk>TMIN, "tka=tk" is set. On the other hand, in a case where "(tia+tka)>(Tc2/2)", one of the output times tia and tka which has a longer output time is set to "(Tc2/2)−TMIN". Also, in a case where the output times tib and tkb of the output voltage vector Vsb is "(tib+tkb)>(Tc2/2)×Nc", one of the output times tib and tkb which one has a shorter output time is brought closer to zero so that "(tib+tkb)=(Tc2/2)×Nc" is satisfied. Nc is the number of half carrier periods in a section in which Vsb is outputted. In this case, Nc=5. However, in a case where "(tib+tkb)=(Tc2/2)×Nc" is not satisfied even when one of the output times tib and tkb which has a shorter output time is set to zero, another one with a longer output time is further set to "(Tc2/2)×Nc". When a modulation factor becomes equal to or larger than 1, the output voltage vector Vsb becomes such a state. In this case, a combination vector of the output voltage vector Vsa and the output voltage vector Vsb is not completely identical to the output voltage vector Vs.

Note that in the present embodiment, a method of generating PWM signals based on a DC current is used in each of the compressor control that is the first inverter control and the fan control that is the second inverter control. However, for example, in the inverter control that is one of them, a method of generating PWM signals by directly detecting a current flowing in a three-phase synchronous motor may be used, or a method of putting a shunt resistor between a switching element group on a lower arm side and a negative side of a DC bus lines and detecting a current flowing in a three-phase synchronous motor based on a decrease in voltage of the shunt resistor may be used.

In a case of fan control using a permanent magnet synchronous motor, driving may be performed using a Hall element that can detect a magnetic pole position thereof. In addition, in the present embodiment, a carrier frequency of the compressor control that is the first inverter control and a carrier frequency of the fan control that is the second inverter control are set to values that can realize synchronization. However, since the carrier frequency is restricted, it is not necessary to set the carrier frequencies to be able to realize synchronization particularly in the two kinds of inverter control in a case where the calculation processing time has an adequate margin with respect to a calculation period.

As described above, the inverter control device of the first embodiment comprises: at least one inverter main circuit to convert, using a plurality of semiconductor switching elements arranged between DC bus lines connected to a positive end and a negative end of a DC power supply respectively, DC power supplied by the DC power supply into three-phase AC power and output the AC power to at least one three-phase synchronous motor; at least one current detector to detect a DC current flowing in the DC bus lines; a voltage detector to detect a DC voltage between the DC bus lines; and an inverter control unit to generate a PWM signal to perform on/off control of each of the plurality of semiconductor switching elements with the DC current and the DC voltage, wherein the inverter control unit sets N as an integral number equal to or larger than 1, sets a carrier period of the PWM signal to be 1/N times as long as a calculation period in which the PWM signal is generated, performs detection of the DC current detected by the current detector in a 1/2 calculation period immediately before a calculation start timing for generating the PWM signal, calculates an output voltage vector at a timing one calculation period after the calculation start timing based on the detected DC current, and reflects a PWM signal generated based on the output voltage vector in one calculation period from a 1/2 calculation period after the calculation start timing to 3/2 control calculation periods after the calculation start timing. With this configuration, in a use in which a calculation time of the inverter control device can be a period shorter than 1/2 of a carrier period, it is possible to acquire a control method for an inverter control device with higher responsiveness in control, to follow a load variation at the time of high-speed rotation, and to control generation of step-out and overcurrent breaking. Furthermore, in a case where two kinds of inverter control for a compressor and a fan are operated by one processor such as a case of an outdoor unit of a room air conditioner, even when a calculation time of one kind of inverter control is equal to or longer than 1/2 of a carrier period, appropriate control responsiveness is acquired without a control breakdown.

In addition, the inverter control unit, in order to be able to perform detection of the DC current in a half carrier period immediately before the calculation start timing, divides the output voltage vector into the output voltage vector Vsa that is a first output voltage vector, in which phase current information for two phases on a current flowing in the three-phase synchronous motor based on the detected DC current, and the output voltage vector Vsb that is a second output voltage vector a combination vector of which and the first output voltage vector becomes the output voltage vector, outputs PWM signals corresponding to the first output voltage vector in a half carrier period immediately before the next calculation start timing, and outputs PWModulation signals corresponding to the second output voltage vector in a remaining output section. With this configuration, it is possible to acquire an inverter control device that can generate a PWM signal based on the latest DC current information and has higher responsiveness in control.

Further, in a case where a modulation factor is equal to or higher than 1, in the inverter control unit, a combination vector of the output voltage vector Vsa in which phase current information for two phases is acquired from the DC current information and the output voltage vector Vsb outputted in an output section other than that of the output voltage vector Vsa is not necessarily identical to the output voltage vector Vs per calculation period. By doing so, phase current information for two phases is constantly acquired from the DC current information, and a stable inverter control device can be acquired.

Besides, in a compressor carrier half period in which a DC current is detected, such as a compressor carrier half period for outputting an output voltage vector Vsa in FIG. 8, in a case of low revolution of the three-phase synchronous motor, the inverter control unit detects the DC current immediately before a first pulse width modulation signal having an on-width with a maximum value among the plurality of pulse width modulation signals for controlling the upper arm side switching elements respectively is switched from on to off, and detects the DC current immediately before a second pulse width modulation signal having an on-width with an intermediate value among the pulse width modulation signals is switched from on to off, so as to acquire the phase current information for two phases, and in a case of high revolution of the three-phase synchronous motor, the inverter control unit detects the DC current immediately before and immediately after the second pulse width modulation signal is switched from on to off, so as to acquire the phase current information for two phases. By so doing, it is possible to acquire a stable inverter control device that is not much influenced by detection timing of a DC current.

In addition, the inverter control unit sets a calculation period in which pulse width modulation signals for a first inverter main circuit to drive a first three-phase synchronous motor among a plurality of three-phase synchronous motors are generated and a calculation period in which pulse width modulation signals for a second inverter main circuit to drive a second three-phase synchronous motor among the plurality of three-phase synchronous motors are generated to be equal to each other in value, and performs generation of the pulse width modulation signals for the first inverter main circuit and generation of the pulse width modulation signals for the second inverter main circuit in separate 1/2 calculation periods, respectively. By so doing, it is possible to acquire an independent inverter control device that is not mutually influenced by calculation times of the controls.

Second Embodiment

In general, silicon (Si) with a relatively low price is often used for the switching elements and the diodes constituting an inverter main circuit. In the second embodiment, description is given for a configuration example of an inverter main circuit using switching elements and diodes formed from a wide bandgap semiconductor material such as silicon carbide (SiC), gallium nitride (GaN) or a diamond (carbon: C) will be described. In the second embodiment, it is assumed that switching elements SW1 to SW6 and switching elements SW1' to SW6' are MOSFETs instead of IGBTs. However, a configuration of the second embodiment will be described with the same signs as in the configuration in FIG. 1. In addition, what is identical to the first embodiment is used as the other configuration and a description of the configuration is omitted.

In the first inverter main circuit 10 and the second inverter main circuit 10', when a change to a configuration using SiC is made, a switching loss in each inverter main circuit is decreased. Accordingly, a balance between the switching loss and an iron loss in the three-phase synchronous motor with respect to a compressor carrier frequency of the PWM signals to drive the inverter main circuit changes, and a carrier frequency, at which a total efficiency of the inverter main circuit and the three-phase synchronous motor is the maximum, changes to a higher side. The carrier frequency with the maximum total efficiency varies depending on a combination of an inverter main circuit and a three-phase synchronous motor, but herein description is made for a case where a total efficiency is the maximum when a compressor carrier frequency is 10 kHz as an example.

Here, an operation in a case where a carrier frequency of a compressor carrier and a carrier frequency of a fan carrier are respectively 10 kHz and 15 kHz will be described with reference to FIGS. 11 to 13.

Figure 11:
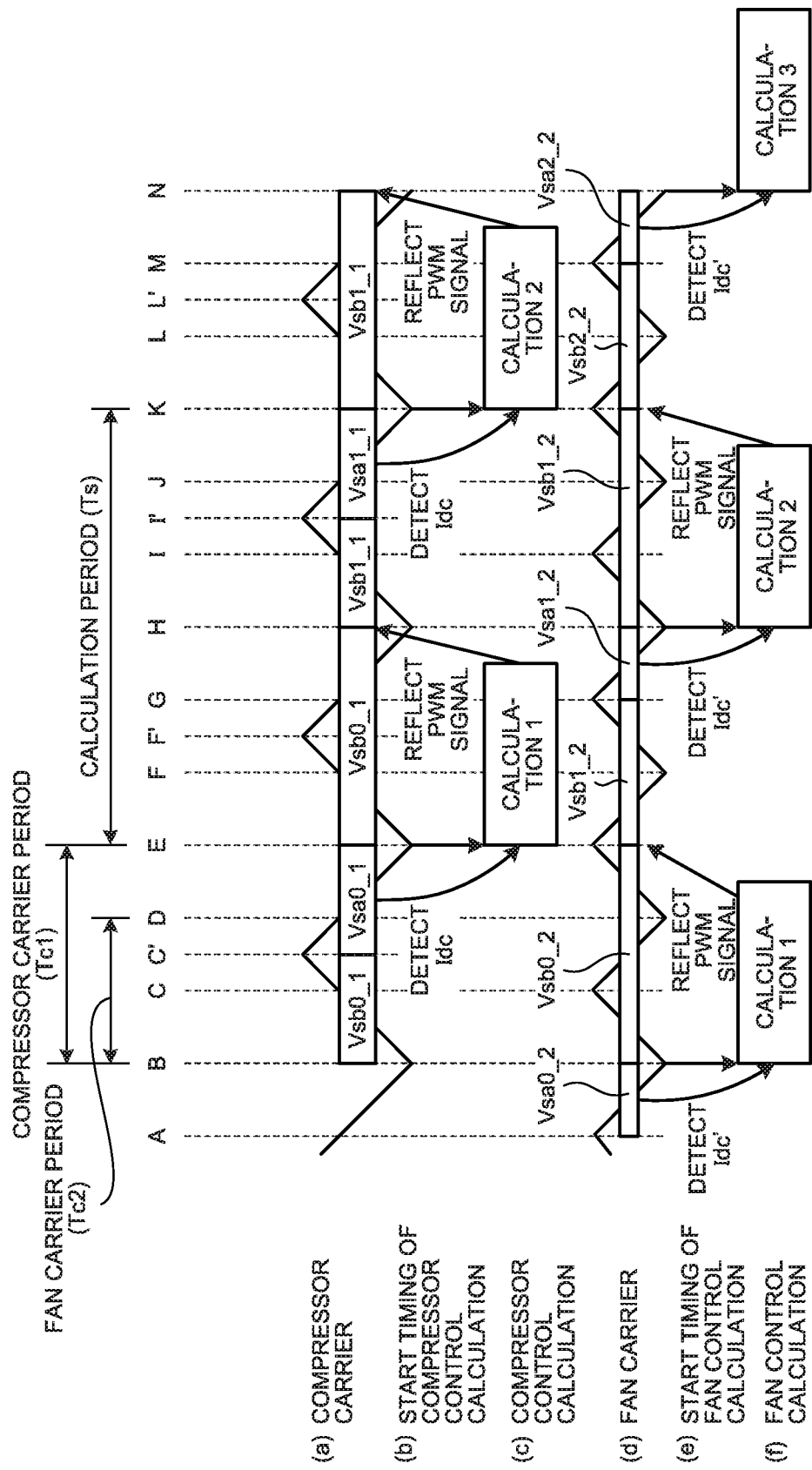
FIG. 11 is a timing chart of a first inverter control calculation and a second inverter control calculation in a inverter control unit according to a second embodiment of the present invention.

FIG. 11 is a timing chart of a first inverter control calculation and a second inverter control calculation in an inverter control unit according to the second embodiment of the present invention. Since meanings of (a) to (f) in FIG. 11 are identical to those of (a) to (f) in FIG. 6, a description thereof is omitted. Also, since an operation of (d) to (f) of a fan control calculation is identical to that of (d) to (f) in FIG. 3, a description thereof is omitted. Here, in an inverter control unit 15 of the second embodiment, the compressor control calculation and fan control calculation have the same calculation period Ts. For example, Ts=1/(5 kHz). Also, the inverter control unit 15 of the second embodiment performs the compressor control calculation for each two carrier periods of a compressor carrier period Tc1, performs the fan control calculation for each three carrier periods of a fan carrier period Tc2, and performs setting in such a manner that calculation start timings thereof are deviated from each other by 1/2 calculation period. Note that it is assumed that each of the calculation processing times is shorter than a 1/2 calculation period.

Figure 12:
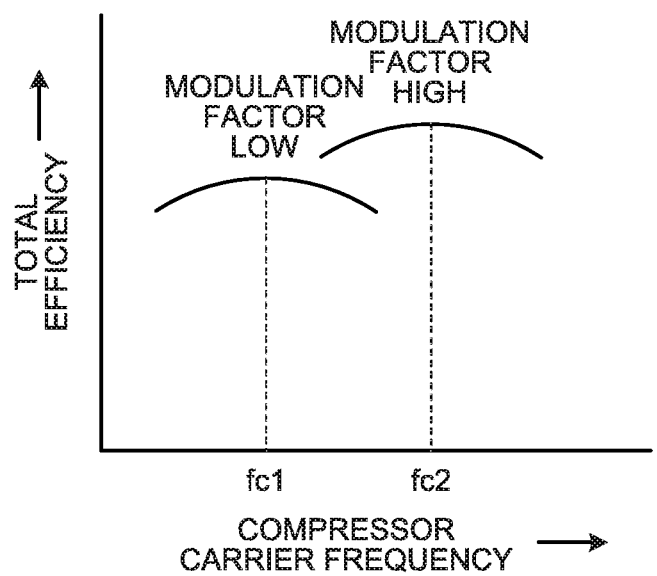
FIG. 12 is a graph showing a relationship between a compressor carrier frequency and total efficiency for modulation factors.

FIG. 12 is a graph illustrating a relationship between a compressor carrier frequency and a total efficiency with respect to a modulation factor. In FIG. 12, a horizontal axis is a compressor carrier frequency and a vertical axis is a total efficiency. In FIG. 12, two modulation factors are illustrated with a center value of a compressor carrier frequency when a modulation factor is "low" being represented as "fc1" and with a center value of a compressor carrier frequency when a modulation factor is "high" being represented as "fc2". Also, in FIG. 12, there is shown a total efficiency in a first three-phase synchronous motor 11 when the compressor carrier frequency is changed.

An operation of compressor control that is a first inverter control of the inverter control unit 15 will be described at a timing of a "Calculation 1" in FIG. 11(c). A calculation start timing of the "Calculation 1" is a valley timing E of the compressor carrier. The inverter control unit 15 detects DC current information Idc to be used in the "Calculation 1" in a section from C' to E that is a half carrier period of the compressor carrier immediately before the calculation start timing E. In this half carrier period section from C' to E, since PWM signals corresponding to an output voltage vector "Vsa0_1" is outputted. Thus, the inverter control unit 15 can detect phase current information for two phases about a current flows in the first three-phase synchronous motor 11, from the DC current information Idc. The inverter control unit 15 calculates an output voltage vector at a timing K that is a timing one calculation period after the calculation start timing E based on the DC current information Idc, and performs a calculation of generating PWM signals corresponding to this output voltage vector in a section from E to H during a 1/2 calculation period from the calculation start timing E. The generated PWM signals are reflected in a section from H to N that is a term form the 1/2 calculation period after the calculation start timing E to 3/2 calculation periods after the same. Here, the inverter control unit 15 outputs PWM signals corresponding to an output voltage vector "Vsa1_1" in a section from I' to K that is a half carrier period of the compressor carrier immediately before a calculation start timing K of the next "Calculation 2", and outputs PWM signals corresponding to an output voltage vector "Vsb1_1" in remaining sections from H to I' and from K to N. Similarly, the inverter control unit 15 performs calculations following the "Calculation 2" in FIG. 11(c) for each calculation period Ts. Here, a calculation start timing is not necessarily set to a valley timing of a triangular wave carrier, and may be a timing later than the above-described valley timing as long as it is possible to complete the calculation before a timing at which the PWM signals are to be reflected.

However, in a case where control is performed so that phase current information for two phases about a current flowing in the first three-phase synchronous motor 11 is acquired from the DC current information Idc, it becomes necessary to deform an output voltage vector in a manner illustrated in FIG. 7 described above. This means that a variation of an output voltage applied to the first three-phase synchronous motor 11 becomes large, and thereby leads to an increase in variation of a phase current flowing in the first three-phase synchronous motor 11. For that reason, especially when a modulation factor is low, an iron loss of the first three-phase synchronous motor 11 is not improved even if a carrier frequency is made higher, and as illustrated in FIG. 12, a compressor carrier frequency at which a total efficiency of the first inverter main circuit 10 and the first three-phase synchronous motor 11 is the maximum is lower when the modulation factor is "low" than when the modulation factor is "high" (fc1<fc2).

Figure 13:
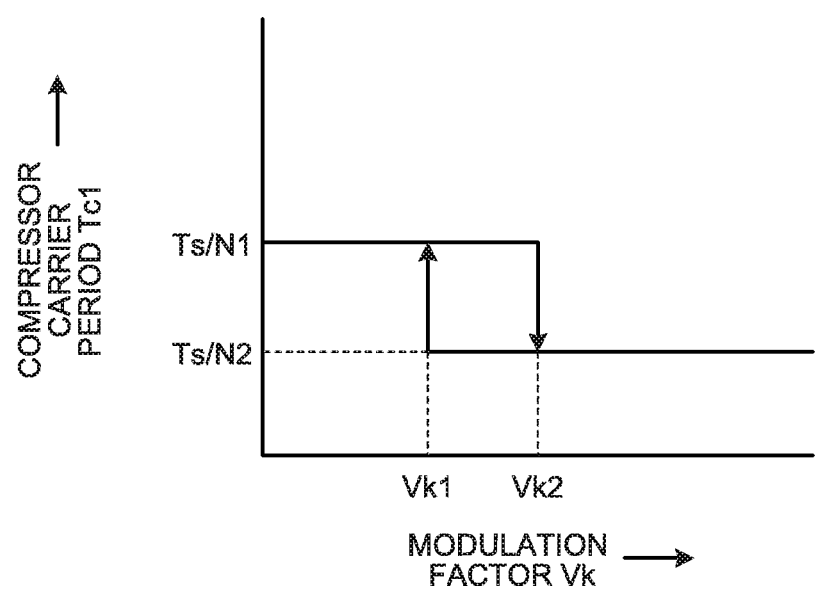
FIG. 13 is a graph showing a relationship between a modulation factor Vk and a compressor carrier period Tc1.

FIG. 13 is a graph illustrating a relationship between a modulation factor Vk and a compressor carrier period Tc1. In FIG. 13, a horizontal axis is a modulation factor and a vertical axis is a compressor carrier period. In FIG. 13, there are shown a compressor carrier period for a modulation factor Vk1 and a compressor carrier period for a modulation factor Vk2. As to the modulation factor Vk, an inequality "Vk2>Vk1" holds. When the modulation factor Vk is equal to or lower than Vk1, the compressor carrier period Tc1 is obtained in the "calculation period Ts/N1". When the modulation factor Vk is equal to or higher than Vk2, the compressor carrier period Tc1 is obtained in the "calculation period Ts/N2". Coefficients N1 and N2 are positive integral numbers and "N2>N1". For example, N1=1 and N2=2. In a case where the modulation factor Vk is higher than Vk1 and lower than Vk2, the compressor carrier period Tc1 retains the last value. Here, an operation of the compressor control calculation in a case where N1=1 and N2=2 can be performed in manners illustrated in FIGS. 3 and 11 described above, respectively. In this way, it is possible to operate the first inverter main circuit 10 and the first three-phase synchronous motor 11 in a state close to a compressor carrier frequency at which a total efficiency is the maximum while a calculation period Ts is fixed.

As described above, the inverter control unit according to the second embodiment fixes the calculation period, sets a value obtained by multiplying the fixed calculation period by a coefficient that is an integral number equal to or larger than 1 as the carrier period, and changes the coefficient according to a modulation factor. By so doing, it is possible to set a carrier period in which a total efficiency of the inverter main circuit and the three-phase synchronous motor is high, in a case where SiC is used for the switching elements of the inverter main circuit.

Additionally, since a coefficient is changed according to a modulation factor, it is possible to constantly perform an operation in a state close to a carrier frequency at which a total efficiency is the maximum while keeping a state in which a calculation period is fixed.

Here, a coefficient N is switched in two steps in FIG. 13. However, the inverter control unit 15 of the second embodiment may be configured to switch a coefficient N in three or more steps according to characteristics of a modulation factor and a total efficiency. Besides, the inverter control unit 15 of the second embodiment is configured to change a coefficient N according to the modulation factor, but may be configured to change the coefficient N according to other parameters with which a similar effect is exerted, such as the number of rotations of the three-phase synchronous motor. Furthermore, the inverter control unit 15 of the second embodiment may be configured to change the coefficient N according to a combination of a modulation factor and the number of rotations of the three-phase synchronous motor.

The configurations described in the above embodiments show examples of contents of the present invention, and so can be combined with a different publicly-known technique, or a part thereof can be omitted and modified without departing from the scope of the present invention.

The invention claimed is:

1. An inverter control device comprising:
at least one inverter main circuit to convert, using a plurality of semiconductor switching elements arranged between DC bus lines connected to a positive end and a negative end of a DC power supply respectively, DC power supplied by the DC power supply into three-phase AC power and output the AC power to at least one three-phase synchronous motor;
at least one current detector to detect a DC current flowing in the DC bus lines;
a voltage detector to detect a DC voltage between the DC bus lines; and
an inverter control unit to generate a pulse width modulation signal to perform on/off control of each of the plurality of semiconductor switching elements with the DC current and the DC voltage,
wherein the inverter control unit sets a calculation period in which the pulse width modulation signal is generated to be twice or longer than a calculation time thereof, sets N as an integral number equal to or larger than 1, sets a carrier period of the pulse width modulation signal to be 1/N times as long as the calculation period, performs detection of the DC current detected by the current detector in a 1/2 calculation period immediately before a calculation start timing for generating the pulse width modulation signal, calculates an output voltage vector based on the detected DC current, and reflects a pulse width modulation signal generated based on the output voltage vector in one calculation period from a 1/2 calculation period after the calculation start timing to 3/2 calculation periods after the same.

2. The inverter control device according to claim 1, wherein the inverter control unit performs detection of the DC current in a half carrier period immediately before the calculation start timing, divides the output voltage vector into a first output voltage vector, in which phase current information for two phases on a current flowing in the three-phase synchronous motor based on the detected DC current, and a second output voltage vector a combination vector of which and the first output voltage vector becomes the output voltage vector, outputs pulse width modulation signals corresponding to the first output voltage vector in a half carrier period immediately before the next calculation start timing, and outputs pulse width modulation signals corresponding to the second output voltage vector in a remaining output section.

3. The inverter control device according to claim 1, wherein the inverter control unit fixes the calculation period, sets a value obtained by multiplying the fixed calculation period by a coefficient that is an integral number equal to or larger than 1 as the carrier period, and changes the coefficient according to a modulation factor.

4. The inverter control device according to claim 1, wherein the plurality of semiconductor switching elements includes a group of upper arm side switching elements which are connected to a positive side of the DC bus lines, and a group of lower arm side switching elements which are connected to a negative side of the DC bus lines, and
in a case of low revolution of the three-phase synchronous motor, the inverter control unit detects the DC current immediately before a first pulse width modulation signal having an on-width with a maximum value among the plurality of pulse width modulation signals for controlling the upper arm side switching elements respectively is switched from on to off, and detects the DC current immediately before a second pulse width modulation signal having an on-width with an intermediate value among the pulse width modulation signals is switched from on to off, so as to acquire the phase current information for two phases on a current flowing in the three-phase synchronous motor, and
in a case of high revolution of the three-phase synchronous motor, the inverter control unit detects the DC current immediately before and immediately after the second pulse width modulation signal is switched from on to off, so as to acquire the phase current information for two phases.

5. The inverter control device according to claim 1, wherein the inverter control unit
sets a calculation period in which pulse width modulation signals for a first inverter main circuit to drive a first three-phase synchronous motor among a plurality of three-phase synchronous motors are generated and a calculation period in which pulse width modulation signals for a second inverter main circuit to drive a second three-phase synchronous motor among the plurality of three-phase synchronous motors are generated to be equal to each other in value, and
performs generation of the pulse width modulation signals for the first inverter main circuit and generation of the pulse width modulation signals for the second inverter main circuit in separate 1/2 calculation periods, respectively.

6. The inverter control device according to claim 1, wherein the plurality of semiconductor switching elements are formed from wide bandgap semiconductor.

7. An air conditioner comprising:
the inverter control device comprising:
at least one inverter main circuit to convert, using a plurality of semiconductor switching elements arranged between DC bus lines connected to a positive end and a negative end of a DC power supply respectively, DC power supplied by the DC power supply into three-phase AC power and output the AC power to at least one three-phase synchronous motor;
at least one current detector to detect a DC current flowing in the DC bus lines;
a voltage detector to detect a DC voltage between the DC bus lines; and
an inverter control unit to generate a pulse width modulation signal to perform on/off control of each of the plurality of semiconductor switching elements with the DC current and the DC voltage,
wherein the inverter control unit sets a calculation period in which the pulse width modulation signal is generated to be twice longer than a calculation time thereof, sets N as an integral number equal to or larger than 1, sets a carrier period of the pulse width modulation signal to be 1/N times as long as the calculation period, performs detection of the DC current detected by the current detector in a 1/2 calculation period immediately before a calculation start timing for generating the pulse width modulation signal, calculates an output voltage vector based on the detected DC current, and reflects a pulse width modulation signal generated based on the output voltage vector in one calculation period from a 1/2 calculation period after the calculation start timing to 3/2 calculation periods after the same, and
the three-phase synchronous motor according to claim 1, which is used for a compressor.

* * * * *